(12) United States Patent
Chen et al.

(10) Patent No.: US 9,229,572 B2
(45) Date of Patent: Jan. 5, 2016

(54) TOUCH DEVICE AND DRIVING METHOD THEREOF

(71) Applicant: Au Optronics Corporation, Hsinchu (TW)

(72) Inventors: Chien-Yu Chen, Taoyuan County (TW); Wen-Chi Chuang, New Taipei (TW); Yi-Chi Chen, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 34 days.

(21) Appl. No.: 14/228,279

(22) Filed: Mar. 28, 2014

(65) Prior Publication Data
US 2015/0116259 A1   Apr. 30, 2015

(30) Foreign Application Priority Data

Oct. 31, 2013  (TW) .............................. 102139593 A

(51) Int. Cl.
*G06F 3/041* (2006.01)
*G06F 3/044* (2006.01)

(52) U.S. Cl.
CPC .............. *G06F 3/0416* (2013.01); *G06F 3/044* (2013.01); *G06F 2203/04107* (2013.01)

(58) Field of Classification Search
CPC .......... G06F 2203/04107; G06F 3/044; G06F 3/0412; G06F 3/041; G06F 3/045; G06F 3/047; G06F 2203/04106; G06F 2203/04113
See application file for complete search history.

(56) References Cited

U.S. PATENT DOCUMENTS

| 7,920,129 B2 | 4/2011 | Hotelling et al. | |
|---|---|---|---|
| 2009/0146970 A1 | 6/2009 | Lowles et al. | |
| 2010/0075720 A1* | 3/2010 | Lee et al. | 455/566 |
| 2010/0214232 A1* | 8/2010 | Chan et al. | 345/173 |
| 2014/0267145 A1* | 9/2014 | Shepelev | 345/174 |

* cited by examiner

*Primary Examiner* — Quan-Zhen Wang
*Assistant Examiner* — Dong Hui Liang
(74) *Attorney, Agent, or Firm* — Jianq Chyun IP Office

(57) ABSTRACT

A touch device includes a touch panel that includes driving lines, sensing lines, a virtual key, a self-sensing line, and a shielding line. The touch panel has a display region and a non-display region. The driving lines extend along a first direction in the display region and further extend into the non-display region. The sensing lines extend along a second direction in the display region and extend into the non-display region. The first direction is different from the second direction. The virtual key is located in the non-display region and between the driving lines and the sensing lines to shield the driving lines from the sensing lines. Each of the self-sensing line and the shielding line is located in the non-display region, connected to the virtual key, and located between the driving lines and the sensing lines to shield the driving lines from the sensing lines.

9 Claims, 3 Drawing Sheets

TOUCH DEVICE AND DRIVING METHOD THEREOF

CROSS-REFERENCE TO RELATED APPLICATION

This application claims the priority benefit of Taiwan application serial no. 102139593, filed on Oct. 31, 2013. The entirety of the above-mentioned patent application is hereby incorporated by reference herein and made a part of this specification.

BACKGROUND OF THE INVENTION

1. Field of the Invention

The invention relates to a device and a driving method thereof. More particularly, the invention relates to a touch device and a driving method thereof.

2. Description of Related Art

Based on different sensing ways, touch panels are generally categorized into resistant touch panels, capacitive touch panels, optical touch panels, sonic wave touch panels, and electromagnetic touch panels. Among these touch panels, the capacitive touch panels have drawn attention from the public due to the rapid growth in the smartphone market.

In general, the touch panel includes an active region and a peripheral region. The active region includes sensing electrodes respectively extending along the X direction and the Y direction for locating a touch position of a target object, and the peripheral region includes signal lines and peripheral circuits connected to the signal lines. In response to market demands, virtual keys acting as function keys may be configured in the peripheral region of the existing touch panel. The virtual keys, however, often occupy a significant area in the peripheral region, and thus the area of the signal lines has to be reduced. As a result, it is rather difficult to reduce the area occupied by the peripheral region and enlarge the display screen.

SUMMARY OF THE INVENTION

The invention is directed to a touch device in which the area occupied by signal lines may be reduced.

The invention is further directed to a driving method of a touch device, wherein a self-sensing line, a virtual key, and a shielding line may constitute a shielding structure for shielding driving lines from sensing lines.

In an embodiment of the invention, a touch device includes a touch panel that includes a plurality of driving lines, a plurality of sensing lines, a virtual key, a self-sensing line, and a shielding line. The touch panel has a display region and a non-display region. The driving lines extend along a first direction in a display region and extend into the non-display region from the display region. The sensing lines extend along a second direction in the display region and extend into the non-display region from the display region. The first direction is different from the second direction. The virtual key is located in the non-display region and between the driving lines and the sensing lines to shield the driving lines from the sensing lines. The self-sensing line is located in the non-display region, connected to the virtual key, and located between the driving lines and the sensing lines to shield the driving lines from the sensing lines. The shielding line is located in the non-display region, connected to the virtual key, and located between the driving lines and the sensing lines to shield the driving lines from the sensing lines.

In an embodiment of the invention, a driving method of a touch device includes following steps. The touch device includes a touch panel that has a display region and a non-display region. Besides, the touch panel includes a plurality of driving lines, a plurality of sensing lines, a virtual key, a self-sensing line, and a shielding line. The driving lines and the sensing lines respectively extend along a first direction and a second direction in the display region and further extend into the non-display region from the display region. The virtual key, the self-sensing line, and the shielding line are located in the non-display region and between the driving lines and the sensing lines. The shielding line is electrically connected to the self-sensing line through the virtual key. In the driving method, the driving lines are sequentially driven, and a variation in a voltage of the sensing lines is sensed when the corresponding driving line is driven. A touch position on the touch panel is determined according to a sensing result. When one of the driving lines is driven, the self-sensing line receives a shielding signal, such that the self-sensing line, the virtual key, and the shielding line shield the driving lines from the sensing lines. The self-sensing line is driven, and whether the virtual key is touched or not is determined according to a variation in a signal of the self-sensing line. When the self-sensing line is driven, the driving lines receive a ground signal, and the sensing lines do not perform a sensing operation.

In the touch device and the driving method thereof, as provided above, the virtual key, the self-sensing line, and the shielding line are arranged between the driving lines and the sensing lines; by applying the driving method, the self-sensing line, the virtual key, and the shielding line are able to shield the driving lines from the sensing lines. That is, the driving signal lines of the virtual key and the shielding signal lines shielding the driving lines from the sensing lines are combined, so as to reduce the space required by the lines and further decrease the distance from the virtual key to the driving lines as well as the area occupied by the peripheral region of the touch device. Thereby, the touch device is more likely to feature the slim border design, and the size of the display screen of the touch device may be enlarged.

Several exemplary embodiments accompanied with figures are described in detail below to further describe the invention in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DETAILED DESCRIPTION OF DISCLOSED EMBODIMENTS

Figure 1:
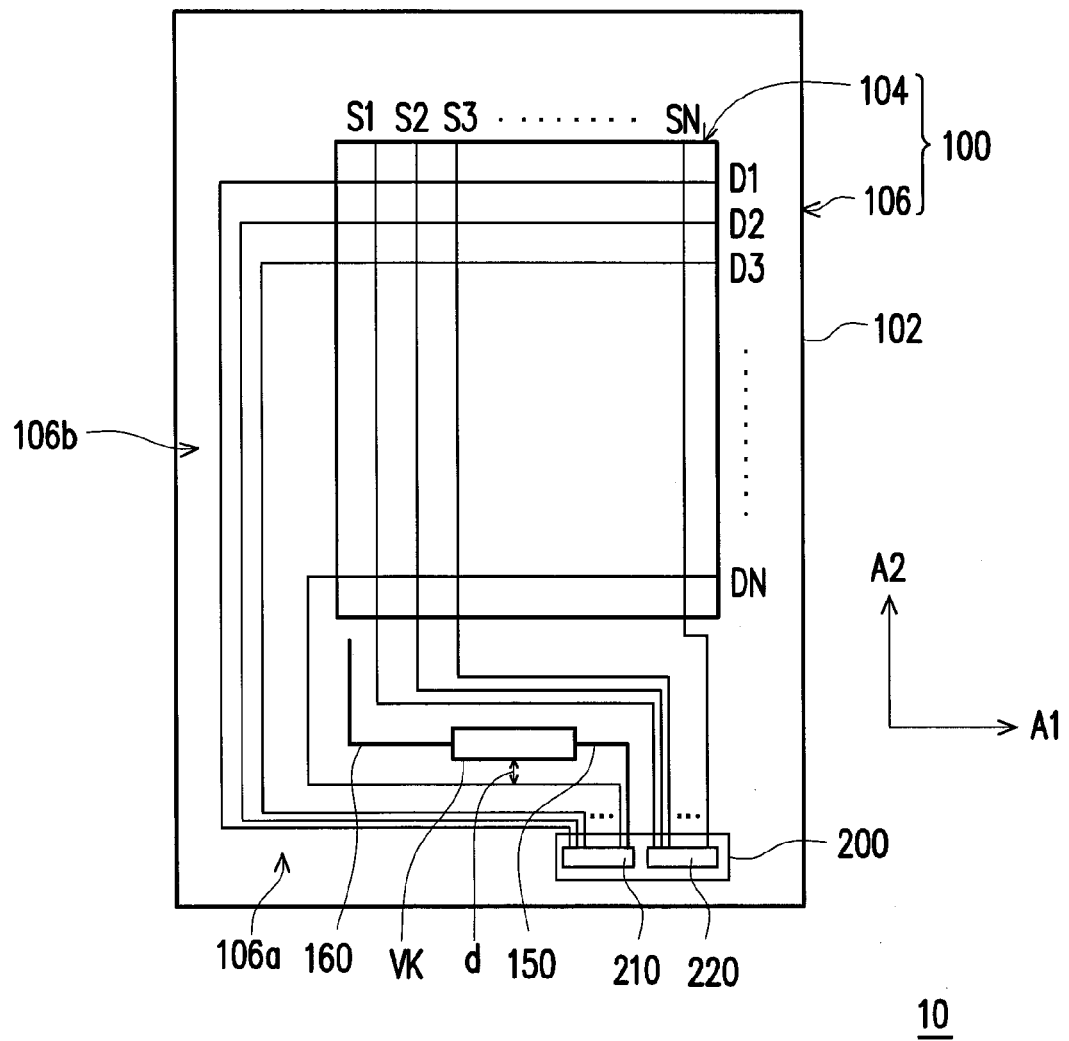
FIG. 1 is a schematic top view illustrating a touch device according to an embodiment of the invention.

FIG. 1 is a schematic top view illustrating a touch device according to an embodiment of the invention. With reference to FIG. 1, a touch device 10 includes a touch panel 100 that includes a plurality of driving lines D1-DN, a plurality of sensing lines S1-SN, a virtual key VK, a self-sensing line 150, and a shielding line 160 which are all located on a substrate 102. In the present embodiment, the substrate 102 is a glass substrate, a plastic substrate, a flexible substrate, or any other suitable substrate, and the touch device 10 may be a smartphone, a personal digital assistant (PDA), a tablet PC, or any other electronic device capable of performing a touch function, which should not be construed as limitations to the invention.

The touch panel 100 has a display region 104 and a non-display region 106. The non-display region 106 surrounds the display region 104 and has a first side 106a and a second side 106b adjacent to each other, for instance; note that the invention is not limited thereto. The driving lines D1-DN extend along a first direction A1 in the display region 104 and extend into the non-display region 106 from the display region 104. The sensing lines S1-SN extend along a second direction A2 in the display region 104 and extend into the non-display region 106 from the display region 104. Here, the first direction A1 is different from the second direction A2. According to the present embodiment, the first direction A1 is perpendicular to the second direction A2, for instance. The touch panel 100 may be a capacitive touch screen and has a plurality of sensing electrodes (not shown) therein, for instance. The sensing electrodes are constituted by transparent electrodes (made of indium tin oxide or any other similar material) or metal mesh (made of one-layered or multi-layered metal material). Through self-capacitance, mutual-capacitance, or a combination thereof, the sensing electrodes are able to detect and receive operations (e.g., pressing, sliding, etc.) of a user with use of his or her finger or any other medium, and the sensing electrodes may act as an input/output (I/O) interface of the touch panel 100. However, the touch panel 100 may also be a resistive touch screen or an optical touch screen, which should not be construed as a limitation to the invention. Besides, the touch panel 100 may also be equipped with a display interface, e.g., a liquid crystal display (LCD) interface, an organic light-emitting device (OLED) display interface, or any other appropriate display interface, so as to display various operations/executions on the touch panel 100. Namely, although the driving lines D1-DN and the sensing lines S1-SN are located in the display region 104, as shown in FIG. 1, electrodes connected to the driving lines D1-DN and the sensing lines S1-SN may also be located in the display region 104 as a matter of fact.

According to the present embodiment, the touch panel 10 further includes a circuit board 200. The circuit board 200 includes a driving unit 210 and a sensing unit 220. The driving lines D1-DN and the self-sensing line 150 are connected to the driving unit 210, and the sensing lines S1-SN are connected to the sensing unit 220, for instance. In the present embodiment, the circuit board 200 is located at the first side 106a of the non-display region 106, the sensing lines S1-SN extend to the first side 106a of the non-display region 106, and the driving lines D1-DN extend from the second side 106b to the first side 106a of the non-display region 106.

The virtual key VK is located in the non-display region 106 and between the driving lines D1-DN and the sensing lines S1-SN to shield the driving lines D1-DN from the sensing lines S1-SN. The self-sensing line 150 is located in the non-display region 106, connected to the virtual key VK, and located between the driving lines D1-DN and the sensing lines S1-SN to shield the driving lines D1-DN from the sensing lines S1-SN. The shielding line 160 is located in the non-display region 106, connected to the virtual key VK, and located between the driving lines D1-DN and the sensing lines S1-SN to shield the driving lines D1-DN from the sensing lines S1-SN. Specifically, the shielding line 160 includes a first end and a second end. The first end is connected to the virtual key VK and extended from the virtual key VK to the space between the driving lines D1-DN and the sensing lines S1-SN, for instance; the second end is located between the driving lines D1-DN and the sensing lines S1-SN and is in a floating state. Hence, the self-sensing line 150 receives a driving signal or a shielding signal from the driving unit 210 or another driving unit. When the self-sensing line 150 receives the driving signal, the touch detection of the virtual key VK is driven in a self-capacitance sensing manner. The virtual key VK and the shielding line 160 receive the driving signal or the shielding signal from the self-sensing line 150. The shielding line 160, the virtual key VK, and the self-sensing line 150 are located between the driving lines D1-DN and the sensing lines S1-SN; therefore, when the self-sensing line 150 receives the shielding signal and transmits the same to the virtual key VK and the shielding line 160, the self-sensing line 150, the virtual key VK, and the shielding line 160 together constitute a shielding structure between the driving lines D1-DN and the sensing lines S1-SN. A distance d from the virtual key VK to the driving lines D1-DN is from about 100 um to about 500 um and is from about 300 um to about 500 um, for instance.

Figure 2:
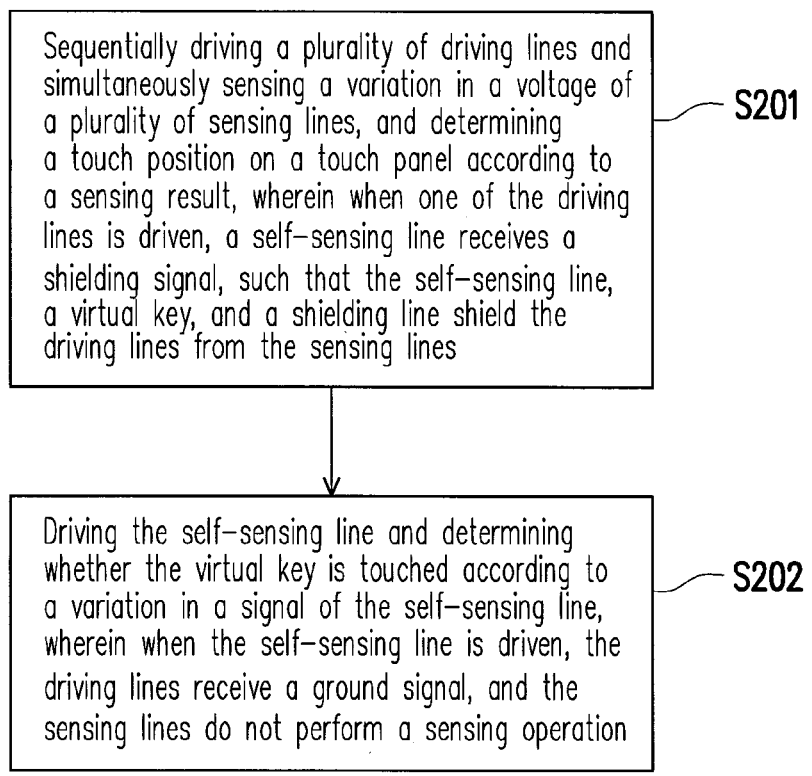
FIG. 2 is a schematic block view illustrating a driving method of a touch device according to an embodiment of the invention.
Figure 3:
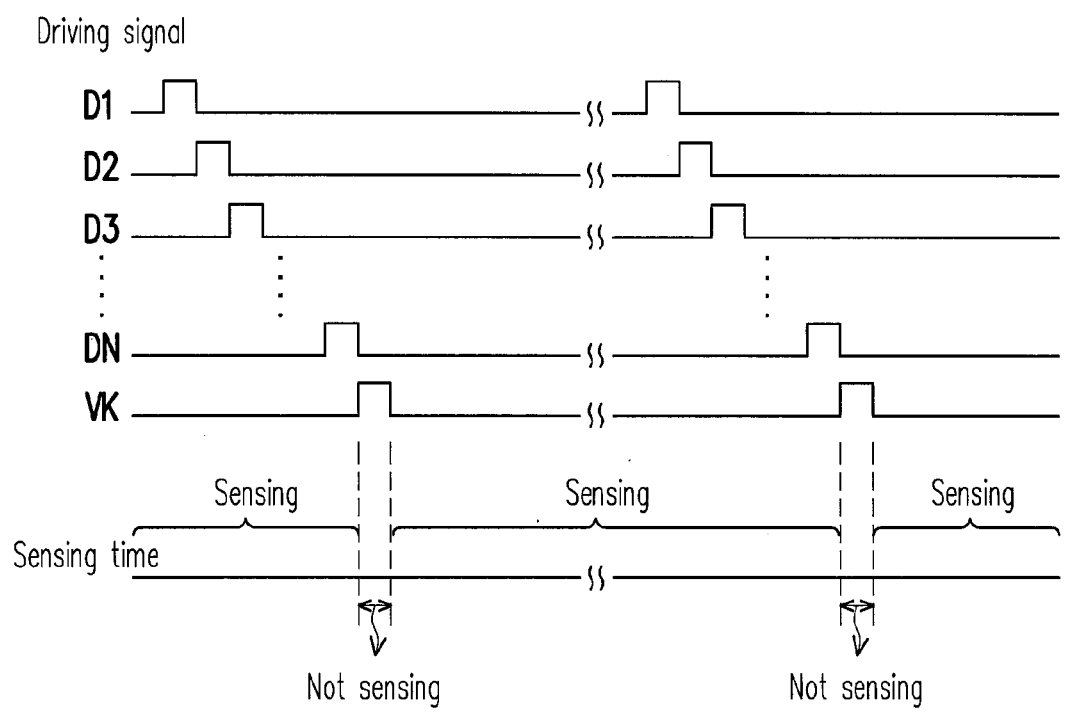
FIG. 3 is a timing control diagram of driving the driving lines and the virtual key according to an embodiment of the invention.

FIG. 2 is a schematic block view illustrating a driving method of a touch device according to an embodiment of the invention. FIG. 3 is a timing control diagram of driving the driving lines and the virtual key according to an embodiment of the invention. With reference to FIG. 1 to FIG. 3, in step S201, the driving unit 210 sequentially drives the driving lines D1-DN; at the same time, the sensing unit 220 senses a variation in a voltage of the sensing lines S1-SN and determines a touch position on the touch panel 100 according to a sensing result. Specifically, when the driving line D1 is driven, the sensing unit 220 senses the variation in the voltage of the sensing line S1. For instance, a touch point (not shown) leads to the variation in the voltage of the sensing line S1, i.e., the voltage level of the sensing line S1 is lower than the voltage level of the untouched sensing line. When the driving line D2 is driven, the sensing unit 220 senses the variation in the voltage of the sensing line S2, and the driving lines D3-DN are sequentially driven in the same manner. Accordingly, while one of the driving lines D1-DN is driven, the sensing unit 220 performs the sensing process. In the present embodiment, the touch panel 100 performs the sensing process in a mutual capacitance mode.

When one of the driving lines D1-DN is driven, the self-sensing line 150 receives a shielding signal SHsig, such that the self-sensing line 150, the virtual key VK, and the shielding line 160 shield the driving lines D1-DN from the sensing lines S1-SN. In particular, as shown in FIG. 3, while one of the driving lines D1-DN is driven, the virtual key VK does not perform the sensing operation, and thus the self-sensing line 150 receives the shielding signal SHsig from the driving unit 106 or another driving unit. Since the self-sensing line 150, the virtual key VK, and the shielding line 160 are electrically connected to one another, the self-sensing line 150, the virtual key VK, and the shielding line 160 receive the shielding signal SHsig. Here, the shielding signal SHsig may be a ground signal.

As shown in FIG. 1, the shielding line 160, the virtual key VK, and the self-sensing line 150 are located between the driving lines D1-DN and the sensing lines S1-SN; therefore, the self-sensing line 150, the virtual key VK, and the shielding line 160 which receive the shielding signal SHsig together constitute a shielding structure between the driving lines D1-DN and the sensing lines S1-SN, so as to prevent the interference between the signals from the driving lines D1-DN and the signals from the shielding lines S1-SN.

In step S202, the self-sensing line 150 is driven, and whether the virtual key VK is touched or not is determined according to a variation in a signal of the self-sensing line 150. When the self-sensing line 150 is driven, the driving lines D1-DN receive a ground signal GND, and the sensing lines S1-SN do not perform a sensing operation. To be specific, as shown in FIG. 3, after the driving lines D1-DN are sequentially driven, the driving unit 106 or another driving unit provides the driving signal to the self-sensing line 150, so as to drive the virtual key VK in the self-capacitance mode and determine whether the virtual key VK is touched or not according to the variation in the signal of the self-sensing line 150. At this time, the sensing lines S1-SN do not perform any sensing operation; that is, the driving unit 106 provides the ground signal GND rather than the driving signal to the driving lines D1-DN, and thus the issue of the signal interference does not arise between the sensing lines S1-SN and the driving lines D1-DN.

According to the present embodiment, the self-sensing line 150 receives the shielding signal or the driving signal, such that the self-sensing line 150, the virtual key VK, and the shielding line 160 together act as the shielding structure or allow the virtual key VK to perform the sensing operation. Particularly, in the driving performance of the touch panel 100, when one line is driven, other lines are in the ground state or receive the shielding signal and thus are not driven. The lines exemplified herein include the driving lines D1-DN and the self-sensing line 150. Hence, when one of the driving lines D1-DN is driven, the self-sensing line 150 receives the shielding signal and transmits the same to the virtual key VK and the shielding line 160. As such, the self-sensing line 150, the virtual key VK, and the shielding line 160 are able to collectively act as the shielding structure between any of the driven driving lines D1-DN and one of the sensing lines S1-SN which correspondingly performs the sensing operation. In other words, while one of the driving lines D1-DN is driven, the self-sensing line 150, the virtual key VK, and the shielding line 160 perform the shielding function. From another perspective, when the virtual key VK performs the sensing operation, the driving lines D1-DN do not perform the sensing operation, and the self-sensing line 150 receives the driving signal and drives the virtual key VK in a self-sensing mode; by means of the signal variation of the self-sensing line 150, whether the virtual key VK is touched or not may be determined. At this time, since the driving lines D1-DN do not perform the sensing operation, the issue of signal interference between the driving lines D1-DN and the sensing lines S1-SN does not exist. As shown in the timing control diagram of FIG. 3, the self-sensing line 150 may be driven later than the driving lines D1-DN, which should however not be construed as a limitation to the invention.

In a normal touch panel, the shielding line is often configured between the driving lines and the sensing lines and between the virtual key and the driving lines/the sensing liens, so as to prevent the signal interference between the driving lines and the sensing lines and the signal interference between the virtual key and the driving lines/the sensing lines; nevertheless, the configuration of the shielding line brings about the significant increase in the space required by lines. By contrast, in the present embodiment, due to the configuration of lines and the circuit timing control, the shielding signal lines shielding the driving lines D1-DN from the sensing lines S1-SN are combined with the signal lines of the virtual key VK; thereby, the self-sensing line 150, the virtual key VK, and the shielding line 160 together serve as the shielding structure, the shielding line between the virtual key VK and the driving lines D1-DN is no longer required, and the space required by the signal lines may be significantly reduced. Particularly, according to the layout of the touch panel 100, the self-sensing line 150, the virtual key VK, and the shielding line 160 are located between the driving lines D1-DN and the sensing lines S1-SN, and the self-sensing line 150, the virtual key VK, and the shielding line 160 are electrically connected to one another. In the driving method of the touch device 10, when one of the driving lines D1-DN in the touch panel 100 is driven, the self-sensing line 150 receives the shielding signal, such that the self-sensing line 150, the virtual key VK, and the shielding line 160 together act as the shielding structure between the driven one of the driving lines D1-DN and one of the sensing lines S1-SN that correspondingly performs the sensing operation. When the virtual key VK performs the sensing operation, the self-sensing line 150 receives the driving signal and drives the virtual key VK in a self-sensing mode; by means of the signal variation of the self-sensing line 150, whether the virtual key VK is touched or not may be determined. At this time, the issue of signal interference between the driving lines D1-DN and the sensing lines S1-SN does not exist because the driving lines D1-DN are in the ground state. Since the shielding signal lines shielding the driving lines D1-DN from the sensing lines S1-SN are combined with the signal lines of the virtual key VK, the shielding line between the virtual key VK and the driving lines D1-DN is no longer required. Hence, the distance d between the virtual key VK and the driving lines D1-DN may be shortened, and the space required by the signal lines may be significantly reduced. As a result, the touch device is more likely to feature the slim border design, and the size of the display screen of the touch device may be enlarged.

To sum up, in the touch device described herein, the self-sensing line, the virtual key, and the shielding line are located between the driving lines and the sensing lines, and the self-sensing line, the virtual key, and the shielding line are electrically connected to one another. When the self-sensing line receives the shielding signal, the self-sensing line, the virtual key, and the shielding line collectively act as the shielding structure between the driving lines and the sensing lines; when the self-sensing line receives the driving signal, the virtual key performs the sensing operation to determine whether the virtual key is touched or not. Namely, the virtual key in the touch device provided herein allows the touch function to be performed while the issue of signal interference is avoided. Hence, additional space required for configuring the shielding line that may shield the driving lines from the sensing lines is no longer necessary, and the distance from the virtual key to the driving lines may be reduced to about 100 um to about 500 um. Thereby, the touch device is more likely to feature the slim border design, and the size of the display screen of the touch device may be enlarged. Moreover, the signal lines may be omitted; accordingly, the manufacturing process of the touch device may be simplified, and the manufacturing costs of the touch device may be lowered down.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A touch device comprising:
a touch panel having a display region and a non-display region and comprising:
- a plurality of driving lines extending along a first direction in the display region and extending into the non-display region from the display region;
- a plurality of sensing lines extending along a second direction in the display region and extending into the non-display region from the display region, the first direction being different from the second direction;
- a virtual key located in the non-display region and between the driving lines and the sensing lines to shield the driving lines from the sensing lines;
- a self-sensing line located in the non-display region, connected to a first part of the virtual key and extended towards the display region, and located between the driving lines and the sensing lines to shield the driving lines from the sensing lines; and
- a shielding line located in the non-display region, connected to a second part of the virtual key, and located between the driving lines and the sensing lines to shield the driving lines from the sensing lines, wherein the first part is different from the second part and the self-sensing line and the shielding line are different lines.

2. The touch device as recited in claim 1, wherein a distance from the virtual key to the driving lines is from 100 um to 500 um.

3. The touch device as recited in claim 1, wherein a distance from the virtual key to the driving lines is from 300 um to 500 um.

4. The touch device as recited in claim 1, wherein the non-display region has a first side and a second side adjacent to each other, the virtual key is located at the first side, the sensing lines are located at the first side, and the driving lines extend from the second side to the first side.

5. The touch device as recited in claim 1, wherein the first direction is perpendicular to the second direction.

6. The touch device as recited in claim 1, further comprising a circuit board, the circuit board comprising a driving unit and a sensing unit, wherein the driving lines are connected to the driving unit, and the sensing lines are connected to the sensing unit.

7. A driving method of a touch device, the touch device comprising a touch panel, the touch panel having a display region and a non-display region and comprising a plurality of driving lines, a plurality of sensing lines, a virtual key, a self-sensing line, and a shielding line, wherein the driving lines and the sensing lines respectively extend along a first direction and a second direction in the display region and further extend into the non-display region from the display region, the virtual key, the self-sensing line, and the shielding line are located in the non-display region and between the driving lines and the sensing lines, the shielding line is electrically connected to the self-sensing line through the virtual key, the self-sensing line is connected to a first part of the virtual key and extended towards the display region, and the shielding line is connected to a second part of the virtual key, wherein the first part is different from the second part and the self-sensing line and the shielding line are different lines, and the driving method of the touch device comprises:
- sequentially driving the driving lines and simultaneously sensing a variation in a voltage of the sensing lines, and determining a touch position on the touch panel according to a sensing result, wherein when one of the driving lines is driven, the self-sensing line receives a shielding signal, such that the self-sensing line, the virtual key, and the shielding line shield the driving lines from the sensing lines; and
- driving the self-sensing line and determining whether the virtual key is touched according to a variation in a signal of the self-sensing line, wherein when the self-sensing line is driven, the driving lines receive a ground signal, and the sensing lines do not perform a sensing operation.

8. The driving method as recited in claim 7, wherein the shielding signal is a ground signal.

9. The driving method as recited in claim 7, wherein the first direction is perpendicular to the second direction.

* * * * *